United States Patent [19]

Nagano

[11] 4,323,357
[45] Apr. 6, 1982

[54] CONNECTING MECHANISM FOR TWO MEMBERS OF A BICYCLE DERAILEUR

[75] Inventor: Masashi Nagano, Sakai, Japan

[73] Assignee: Shimano Industrial Company Limited, Osaka, Japan

[21] Appl. No.: 138,737

[22] Filed: Apr. 9, 1980

[30] Foreign Application Priority Data

Apr. 23, 1979 [JP] Japan .................. 54-55107[U]

[51] Int. Cl.³ .............. F16J 15/34; F16C 33/72; F16H 11/00
[52] U.S. Cl. .............................. 474/82; 277/95; 308/36.1
[58] Field of Search .............. 474/82, 81, 80; 308/36.1; 277/95

[56] References Cited

U.S. PATENT DOCUMENTS

| | | | |
|---|---|---|---|
| 3,364,763 | 1/1968 | Juy | 474/82 |
| 3,909,076 | 9/1975 | Kato | 277/95 |
| 4,027,542 | 6/1977 | Nagano | 474/82 |

FOREIGN PATENT DOCUMENTS

| | | | |
|---|---|---|---|
| 1246447 | 8/1967 | Fed. Rep. of Germany | 474/82 |
| 732035 | 6/1955 | United Kingdom | 474/82 |

Primary Examiner—C. J. Husar
Assistant Examiner—Conrad Berman
Attorney, Agent, or Firm—Stevens, Davis, Miller & Mosher

[57] ABSTRACT

A connecting mechanism for two members of a bicycle derailleur is provided with first and second bearings interposed between a supporting tubular member provided at a first member, such as a base member or movable member of the derailleur, and a shaft provided at a second member, such as a bracket member or chain change-over cage, each of the first and second bearings comprising a tubular portion inserted between the inner periphery of the supporting tubular member and the outer periphery of the shaft and a flange portion opposite to an end face of the supporting tubular member. At least one of the first and second bearings is provided at the flange portion thereof with an annular groove opening at one axial side of the flange portion. An annular elastically deformable sealing member is loosely fit into the groove and is elastically deformed to compensate for errors in the axial dimensions of the supporting tubular member, shaft, or bearings, thereby eliminating gaps produced at the surfaces of members slidably contacting with the bearings.

11 Claims, 7 Drawing Figures

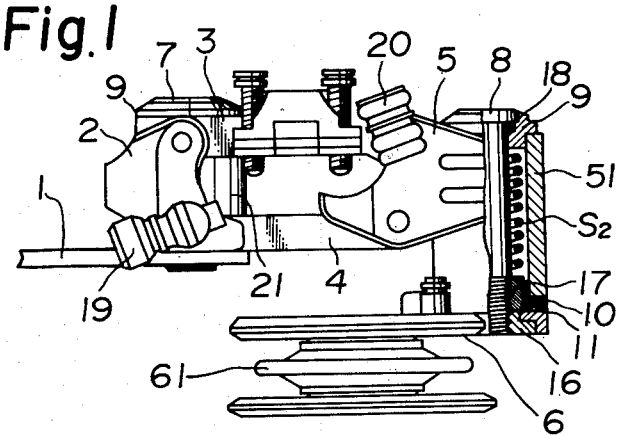
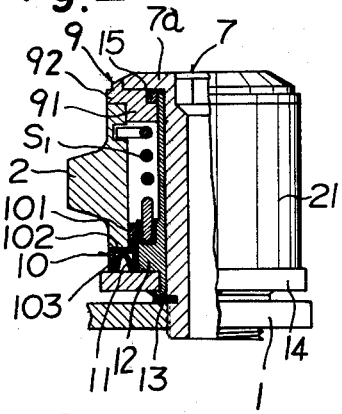
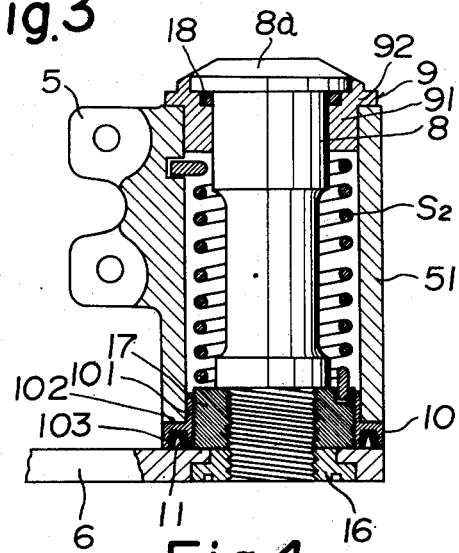
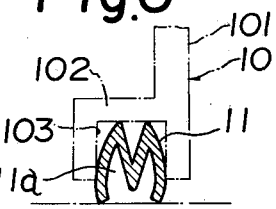
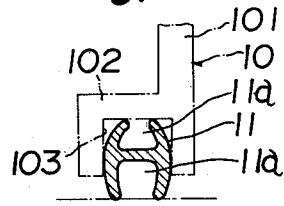
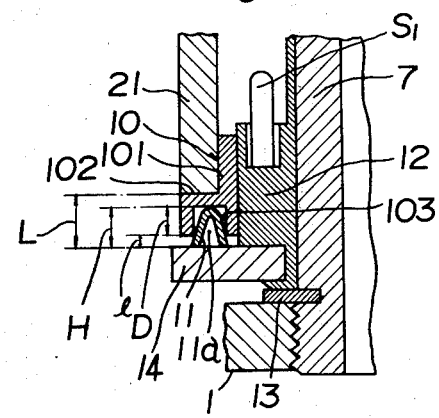
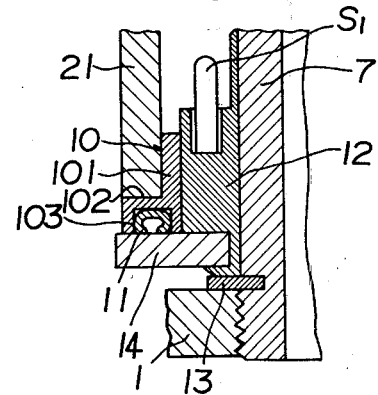

CONNECTING MECHANISM FOR TWO MEMBERS OF A BICYCLE DERAILEUR

BACKGROUND AND SUMMARY OF THE INVENTION

This invention relates to a connecting mechanism for two members at a bicycle derailleur, and more particularly to a connecting mechanism for connecting a first member having a supporting tubular member and a second member having a shaft.

Generally, a bicycle derailleur has a base member, two linkage members and a movable member. The base member is mounted on a fork end of a bicycle frame with or without a bracket member and the movable member carries a chain change-over cage having pulleys.

When a bracket member is used, the derailleur is provided with shafts fixed to the bracket member and change-over cage and with supporting tubular members provided at the base member and movable member respectively, the shafts being inserted into the supporting tubular members so that the base member and change-over cage are swingably supported to the bracket member and movable member through respective bearings.

A coiled spring is housed within each supporting tubular member to respectively bias the base member and change-over cage unidirectionally with respect to the bracket member and movable member. During operation a control wire is manipulated so that a driving chain carried by the pulleys is switched to a selected one of the multistage sprockets provided at a hub at the bicycle.

A derailleur having the just described construction also conventionally includes a rotary connection between the supporting tubular member at the first member, such as the base member or movable member, and the shaft at the second member, such as the bracket member or change-over cage. The rotary connection contains bearings formed mainly of synthetic resin. Unfortunately, the rotary connection is poorly sealed creating a problem in that dust or rain water can enter the supporting tubular member interfering with the lubricating oil contained therein or rusting the coiled spring, thus impeding smooth rotation of the rotary connection.

One solution to this problem would be to interpose a sealing member in the rotary connection. However, the supporting tubular members and shafts of the derailleur have rough dimensions and errors of about ±1 mm are common in the completed assembly. This makes it difficult to ensure a tight seal even when a sealing member of fixed size is used, because the component tolerances form gaps. Even if a tight sealing is attained, a greater resistance is then applied against rotation of the rotary connection which hinders its proper rotation. Thus, when dimensional errors exist in the component members, it is difficult to reliably seal the rotary connection while keeping the rotational resistance from increasing.

This invention has been designed to overcome the above problems. An object of the invention is to provide a connecting mechanism for two members at a bicycle derailleur which is capable of compensating for dimensional errors existing in the rotary connection at the derailleur, thereby always ensuring that the rotary connection is completely sealed while the rotational resistance is maintained under a prescribed value.

The invention is characterized by a pair of first and second bearings which are interposed between a supporting tubular member provided at a first member, such as a base member or movable member, and a shaft provided at a second member, such as a bracket member or change-over cage, at the derailleur. The first and second bearings each have a tubular portion inserted between the inner periphery of the tubular member and the outer periphery of the shaft and a flange disposed opposite to an axial end face of the supporting tubular member. At least one of the first and second bearings defines at its flange an annular groove opening at one axial side of the flange, into which groove an annular sealing member comprising elastic material is loosely fit being freely elastically deformed to compensate for errors in axial dimension in the supporting tubular member, shaft or bearings, thus eliminating the usual minimum gaps produced between the bearings and the surfaces of members slidably contacting with them.

The annular groove at the flange of the respective bearings is formed large enough to allow the sealing member to be elastically deformable within the groove. The sealing member is made larger in height than the groove and projects beyond the groove opening thereby contacting at the projecting end face with either the end face of the supporting tubular member or the second member.

With this arrangement, if a minor error exists in the axial dimension of the supporting tubular member or shaft creating a narrow gap between the end face of the supporting tubular member and the bearing or between the bearing and the second member, the sealing member is deformed in height sinking at a part of its projecting end into the groove, to compensate for the axial dimension error. On the other hand, when the gap is larger, the sealing member expands towards its full projecting height to compensate for the axial dimension error. In both the cases, the projecting end face of the sealing member contacts elastically with either the end face of the supporting tubular member or the second member to close the gap. As a result, the connecting mechanism of the invention always ensures closure of the gap without an increase in the rotational resistance applied to the connecting mechanism thereby obtaining an improved sealing effect.

These and other objects and novel features of the invention will be more apparent from the following description of an embodiment thereof described in connection with the accompanying drawings.

BRIEF DESCRIPTION OF THE DRAWINGS

FIG. 1 is a partially cut-away bottom plan view of a derailleur provided with a connecting mechanism of the invention, FIG. 2 is a partially cut-away enlarged front view, showing a connecting portion of a bracket member with a base member at the derailleur shown in FIG. 1, FIG. 3 is an enlarged sectional view of a connecting portion of a movable member with a chain change-over cage at the derailleur shown in FIG. 1, FIG. 4 is an enlarged sectional view of a principal portion at the connecting portion shown in FIG. 2, FIG. 5 is a sectional view corresponding to FIG. 4, showing an elastically deformed sealing member, and FIGS. 6 and 7 are partially enlarged sectional views of sealing members only.

DETAILED DESCRIPTION OF THE INVENTION

A typical rear derailleur for a bicycle is shown in FIG. 1, which is mounted together with a rear wheel hub to a bicycle back fork and is of a type of which uses a bracket member 1 to fix the derailleur to the back fork.

The rear derailleur comprises a base member 2 connected swingably to the bracket member 1, a pair of linkage members 3 and 4 supported to the base member 2, and a movable member 5 carried by the linkage members 3 and 4, the movable member 5 swingably connecting with a chain change-over cage 6 having pulleys 61.

A connecting mechanism of the invention serves to connect the base member 2 or change-over cage 6 respectively to the bracket member 1 or movable member 5. In this embodiment and for the purpose of further description, the base member 2 and movable member 5 are called first members, and the bracket member 1 and change-over cage 6 are called second members.

The first members, i.e., base member 2 and movable member 5, have integral supporting tubular members 21 and 51 respectively. The second members, i.e., bracket member 1 and change-over cage 6, respectively support fixed shafts 7 and 8 having heads 7a and 8a. Shafts 7 and 8 are respectively inserted into the supporting tubular members 21 and 51 and are rotatably connected thereto through pairs of first and second bearings 9 and 10.

The bearings 9 and 10 are formed mainly of synthetic resin, such as a diureide compound, and comprise tubular portions 91 and 101 and flanges 92 and 102 respectively. The tubular portions 91 and 101 are interposed between the inner periphery of the respective tubular members 21 and 51 and the outer periphery of the respective shafts 7 and 8, and the flanges 92 and 102 abut against both axial end faces of the respective tubular members 21 and 51. Each of the supporting tubular members 21 and 51 has a first and a second axial end portion. Each of the first bearings 9 is interposed between the end face at the first end portion of the respective supporting tubular members 21 and 51 and each of the heads 7a and 8a of shafts 7 and 8. Each of the second bearings 10 is interposed between the end face at the second end portion of the respective tubular members 21 and 51 and the second member, i.e., the bracket member 1 or change-over cage 6.

At least one of the first and second bearings 9 and 10 is provided at its flange with an annular groove 103 opening at one axial side of the flange, and an annular sealing member 11 is loose fit into the groove 103.

Next, the connecting mechanism of the invention will be described with particular reference to FIGS. 2 and 3.

Referring to FIG. 2, the mechanism for connecting the base member 2 to the bracket member 1 is shown, in which a bush 12 is sleeved onto the shaft 7 and fixed to a stopper plate 14 by any suitable fixing arrangement such as welding, soldering adhesives, etc. The shaft 7 is retained to the stopper plate 14 by use of an E-ring 13, and an end of the shaft 7, positioned outwardly from the E-ring 13, is screwed with the bracket member 1. The shaft 7 is also inserted into the supporting tubular member 21 at the base member 2. The first bearing 9 is interposed between the head 7a of shaft 7 and the first end portion of supporting tubular member 21, and the second bearing 10 is interposed between the stopper plate 14 and the second end portion of supporting tubular member 21. A groove 103 is formed at the flange 102 of the second bearing 10 and opens at one axial side of flange 102 opposite to the stopper plate 14. The sealing member 11 is loose fit into the groove 103. The stopper plate 14 may be omitted in which case the second bearing 10 is interposed between the end face of supporting tubular member 21 and the bracket member 1 instead of the stopper plate 14.

The sealing member 11 is formed of elastic material, for example, oil-moistened porous felt, rubber or synthetic resin; and is loose fit into the groove 103 at the second bearing 10 and is elastically deformable within the groove. The sealing member 11, as shown in FIG. 4, has a height H larger than a depth D of the groove 103, projects partially from the opening of groove 103, and contacts at the projecting end face elastically with the surface of stopper plate 14 (or bracket member 1, if stopper plate 14 is omitted). The sealing member 11 is smaller in its widthwise dimension than the groove 103, or has a U-shape cross section to define a cavity 11a as shown in FIG. 4, thereby being elastically deformable widthwise of the groove 103. As a result, the height H of sealing member 11 is easily changed, as shown in FIG. 5.

Accordingly, the sealing member 11 can close a gap between the second bearing 10 and the stopper plate 14 even when an axial dimension error exists at, for example, the supporting tubular member 21, causing a change from the norm in length L between the stopper plate 14 and the supporting tubular member 21 including the bearing flange and sealing member. Stated otherwise, sealing member 11 accommodates changes from the norm in the interval of length l between the second bearing 10 and the stopper plate 14 as shown in FIG. 4. Hence, the sealing member 11 always obtains a sealing effect notwithstanding the existence of axial dimension errors in the completed connecting mechanism assembly.

If the axial dimension error is at a maximum and the length l is maximum, e.g., 2 mm, the sealing member 11, as shown in FIG. 4, expands in height to allow the projecting end faces to contact elastically with the stopper plate 14 to thereby close the gap, while the supporting tubular member 21 is subjected to the minimum rotational resistance with respect to the stopper plate 14.

On the other hand, if the axial dimension error is small and the length l is zero, the sealing member 11, as shown in FIG. 5, is elastically deformed to sink at its projecting ends into the groove 103 and elastically contacts at the deformed ends with the stopper plate 14. In this case, the gap is of course closed, and the elastic contacting force between the sealing member 11 and stopper plate 14 becomes larger than when the length l is maximum, creating maximum resistance against rotation of the supporting tubular member 21. However, when this occurs, the flange 102 of second bearing 10 simultaneously comes into contact with the stopper plate 14, to restrict the increase in rotational resistance to a value which does not hinder the rotation of supporting tubular member 21.

The sealing member 11 may have a round or square cross-sectional shape, but preferably has a U-like cross-sectional shape as shown in FIG. 2, a W-like cross-sectional shape as shown in FIG. 6, or an H-like cross-sectional shape as shown in FIG. 7. The preferred shapes have cavities 11a which prevent a considerable change in sealing member contact pressure even when it is elastically deformed. That is, a round or square sealing member has an increased restoring force when elastically deformed. Hence, a large rotating force from a large amount of elastic deformation which occurs with a small gap, acts on the portion of sealing member 11 which contacts with the stopper plate 14. This results in supporting tubular member 21 being subjected to a rotational resistance with respect to the stopper plate 14 in excess of a desired value. However, when the sealing member 11 has a cross-sectional shape including cavities 11a as shown in FIGS. 2, 6 and 7, its restoring force is reduced, thereby restraining the increase in rotational resistance.

The supporting tubular member 21 is rotatably supported with respect to the stopper plate 14 through the first and second bearings 9 and 10, and the sealing member 11 carried by the second bearing 10 seals a rotary connection between the stopper plate 14 and the end face at the second end portion of supporting tubular member 21 supported by the second bearing 10. The elastic restoring force of sealing member 11 also causes tubular member 2 to press at its end face of the first end portion against the first bearing 9 to thereby seal the rotary connection between the supporting tubular member 21 and the shaft 7.

As described, the second bearing 10, which supports the supporting tubular member 21, also serves to hold the sealing member 11, so that the sealing member 11 compensates for dimensional errors in the supporting tubular members 21, bush 12 and shaft 7, to thereby ensure a complete sealing effect.

FIG. 2 also shows a coiled spring $S_1$ wound around the bush 12 within the supporting tubular member 21. The spring $S_1$ is retained at its one end to the tubular member 21 and at the other end to the bush 12. A sealing material 15, such as rubber, is inserted between the inner periphery of first bearing 9 and the shaft head 7a and bush 12.

Although the sealing member 11 has been described as being held within the groove 103 at the second bearing 10, it may be held within a groove provided at the first bearing 9. Also, the groove 103 which is provided at the axial side of bearing 10 opposite to the stopper plate 14, may be provided instead at the other axial side opposite to the end face at the second end portion of supporting tubular member 21. The groove 103 also may open at its inner periphery to define an annular space between the wall of groove 103 and the bush 12, the space receiving therein the sealing member 11.

A connecting mechanism of the invention, which swingably connects the change-over cage 6 to the movable member 5, will next be described with reference to FIG. 3.

This mechanism is basically the same as that shown in FIG. 2, but differs therefrom only in that the shaft 8 is fixed to the change-over cage 6 by means of a nut 16 and is freely rotatable within the supporting tubular member 51 provided at the movable member 5.

Referring to FIG. 3, the first bearing 9 is interposed between the first end portion of supporting tubular member 51 and the head 8a of shaft 8, and the second bearing 10 is interposed between the second end portion of supporting tubular member 51 and the change-over cage 6. The shaft 8 is screwed at its tip with a bush 17. The second bearing 10 is interposed, at its tubular portion 101, between the bush 17 and the inner periphery at the second end portion of supporting tubular member 51 and at the flange 102, between the change-over cage 6 and the end face at the second end portion of tubular member 61. The sealing member 11 is held within a groove 103 provided in flange 102 and contacts with the change-over cage 6.

Accordingly, the rotary connection between the supporting tubular member 51 at the movable member 5 and the shaft 8 at the change-over cage is reliably sealed by the sealing member 11 which, as in the FIG. 2 arrangement, compensates for dimensional errors of the supporting tubular member 51, shaft 8 or bush 17, while eliminating a large increase in a rotational resistance applied to the supporting tubular member 51, and in turn, to the shaft 8.

As an alternative arrangement in FIG. 3, the first bearing 9 may be provided at its flange 92 with a groove, within which a sealing member 11 is held.

FIG. 3 also shows a coiled spring $S_2$ wound around the shaft 8 within the supporting tubular member 51, and retained at one end thereto, and at the other end to the bush 17. A sealing material 18, such as rubber, is inserted between the first bearing 9 and the head 8a of shaft 8.

Referring again to FIG. 1, reference number 19 designates a holder fixed to the base member 2 to hold an outer cable, and reference numeral 20 designates a retainer fixed to the movable member 5 to retain an inner wire inserted through the outer cable. The inner wire is pulled to move the movable member 5, and in turn, the change-over cage 6, through a parallelogram linkage formed by base member 2, linkage members 3, 4 and movable member 5.

As clearly apparent from the above description, the connecting mechanism of the invention connects two members, a first member having a supporting tubular member and a second member having a shaft, and is provided with a first and second bearing interposed between the supporting tubular member and the shaft and between the supporting tubular member and the second member respectively. Each of the bearings comprises a tubular portion interposed between the inner periphery of the supporting tubular member and the outer periphery of the shaft, and a flange opposite to the axial end face of the supporting tubular member. At least one of the bearings is provided at its flange with a groove, within which an elastically deformable sealing member is loosely fit. The sealing member partially projects from the groove through an opening thereof to elastically contact with the second member or an end face of the supporting tubular member. As a result, the sealing member ensures a tight sealing of the rotary connection between the bearing and the end face of the supporting tubular member or between the bearing and the second member, preventing dust or rain from entering the supporting tubular members and also eliminating seepage or contamination of lubricating oil filled within the supporting tubular member.

Furthermore, the sealing member is elastically deformable to compensate for dimensional errors which may exist in the supporting tubular member, shaft or bearings, thereby ensuring a highly effective sealing of the rotary connection and elimination of any gaps.

In addition, since the sealing member is loosely fit within the groove, its elastic deformation caused by dimensional errors does not increase the rotational resistance to the point of hindering rotation of the rotary connection.

While preferred embodiments of the invention have been described, it is to be understood that other variant forms of the invention might be adopted. Accordingly, the invention is not limited by the foregoing description, but is only limited by the following claims.

What is claimed is:

1. A connecting mechanism which rotatably connects a first member and a second member of a bicycle derailleur, said first member including a supporting tubular member having first and second lengthwise end portions, said second member having a headed shaft insertable into said supporting tubular member, said connecting mechanism comprising:

a first bearing interposed between the first end portion of said supporting tubular member and the head of said shaft;

a second bearing interposed between the second end portion of said supporting tubular member and said second member;

each of said first and second bearings comprising a tubular portion inserted between the inner periphery of said supporting tubular member and the outer periphery of said shaft and a flange portion disposed opposite to the end face at each of said end portions of said supporting tubular member, the flange portion of at least one of said first and second bearings having an annular groove opening at one axial side of said flange; and an annular sealing member loosely fit into said groove, said sealing member comprising elastic material and being elastically deformable within said groove, said sealing member having a height greater than a depth of said groove, and projecting from the opening of said groove, the projecting end face of said sealing member elastically contacting with one of the second member and at the end face of said tubular member opposite to said one axial side of said flange, on which side said groove is opening.

2. A connecting mechanism according to claim 1, wherein said sealing member is provided at its side in the direction of its height with at least one cavity.

3. A connecting mechanism according to claim 1, wherein said sealing member has a U-shaped cross section.

4. A connecting mechanism according to claim 1, wherein said sealing member has a W-shaped cross section.

5. A connecting mechanism according to claim 1, wherein said sealing member has an H-shaped cross section.

6. A connecting mechanism according to claim 1, wherein said sealing member comprises an elastic and porous member and is lubricating-oil-moistened.

7. A connecting mechanism according to claim 1, wherein said derailleur comprises a base member, two linkage members, a movable member, and a chain change-over cage having pulleys, said movable member corresponding to said first member, said change-over cage corresponding to said second member; and wherein said supporting tubular member provided at said movable member houses a coiled spring for biasing said change-over cage unidirectionally with respect to said movable member.

8. A connecting mechanism according to claim 1, wherein said derailleur comprises a bracket member, a base member, two linkage members, a movable member, and a chain change-over cage having pulleys, said base member and movable member corresponding to said first member, said bracket member and change-over cage corresponding to said second member; and wherein said supporting tubular member provided at said base member houses a coiled spring for biasing said base member unidirectionally with respect to said bracket member, and said supporting tubular member provided at said movable member houses a coiled spring for biasing said change-over cage unidirectionally with respect to said movable member.

9. A connecting mechanism according to claim 1, wherein a bush is sleeved onto said shaft and fixed thereto, said tubular portion of the second bearing being interposed between the inner periphery of said supporting tubular member and the outer periphery of said bush.

10. A connecting mechanism according to claim 2, wherein said flange portion of said second bearing is provided at its axial side opposite to said second member with an annular groove opening toward said second member, said sealing member, which is insertably supported in said groove, being in elastic contact with said second member.

11. A connecting mechanism according to claim 2, wherein said flange portion of said second bearing is provided at its axial side opposite to the end face at the second end portion of said supporting tubular member with an annular groove opening toward said end face, said sealing member, which is insertably supported in said groove, being in elastic contact with said end face at the second end portion of said supporting tubular member.

* * * * *